H. H. PENTECOST.
SPRING WHEEL.
APPLICATION FILED MAY 25, 1915.
1,180,601.
Patented Apr. 25, 1916.
2 SHEETS—SHEET 1.
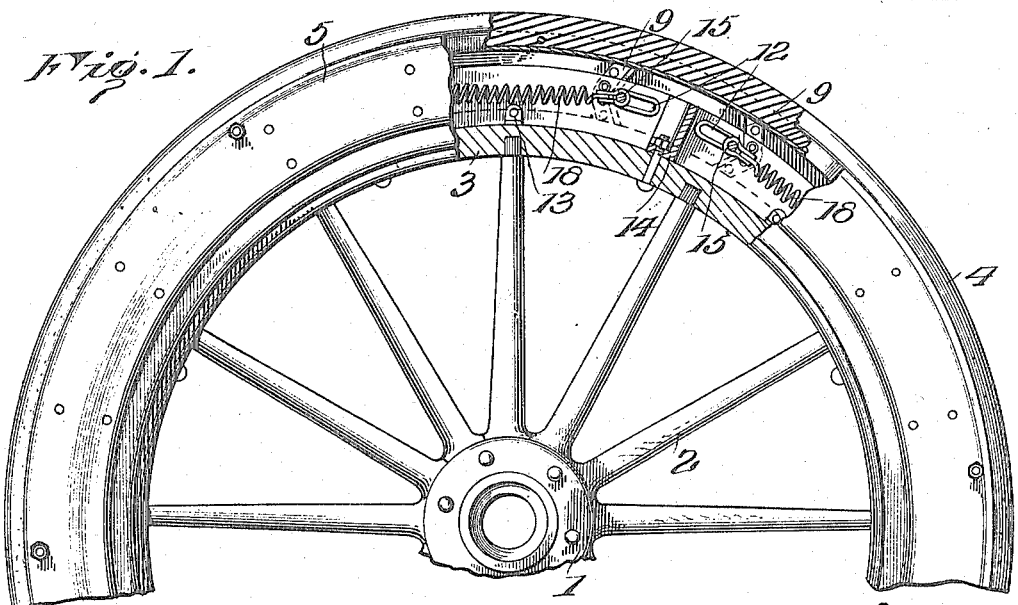
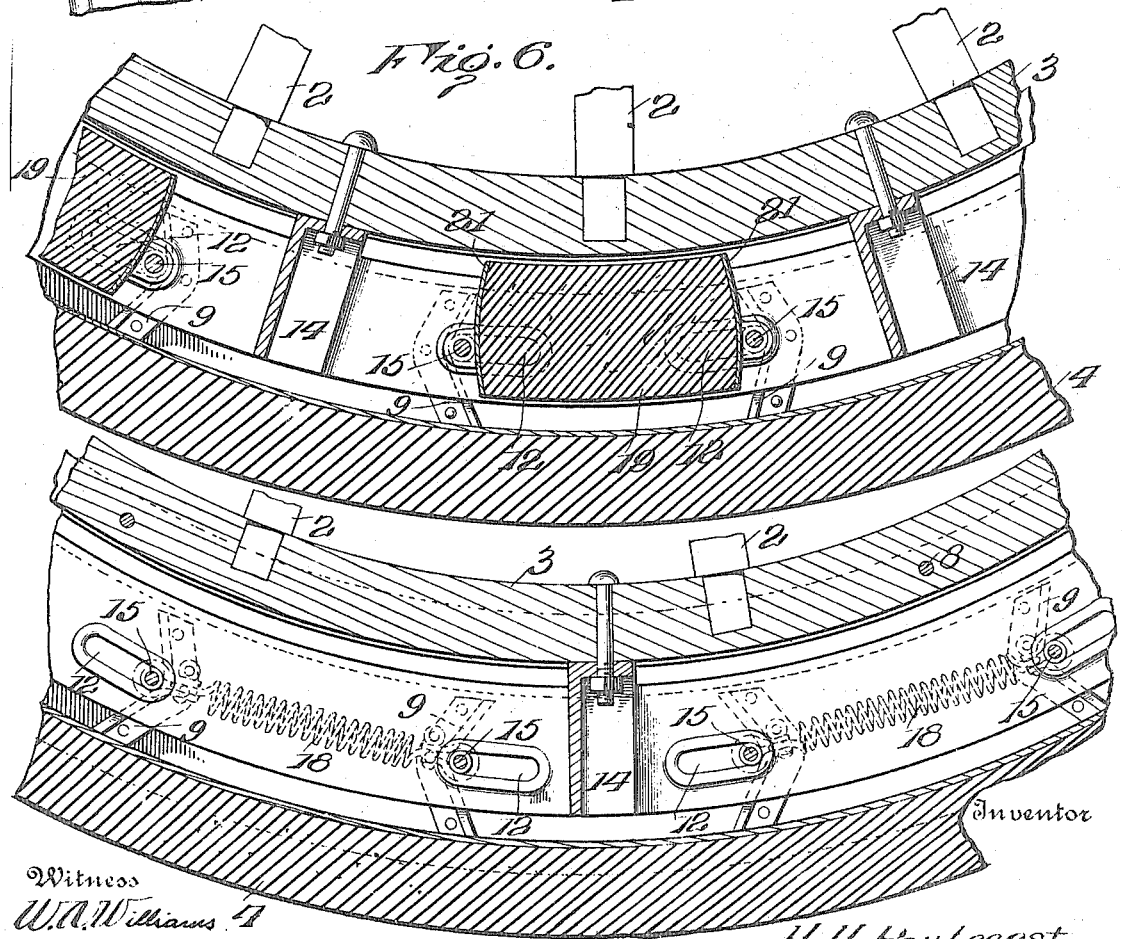
Witness
W. A. Williams
Inventor
H. H. Pentecost
By
Attorneys

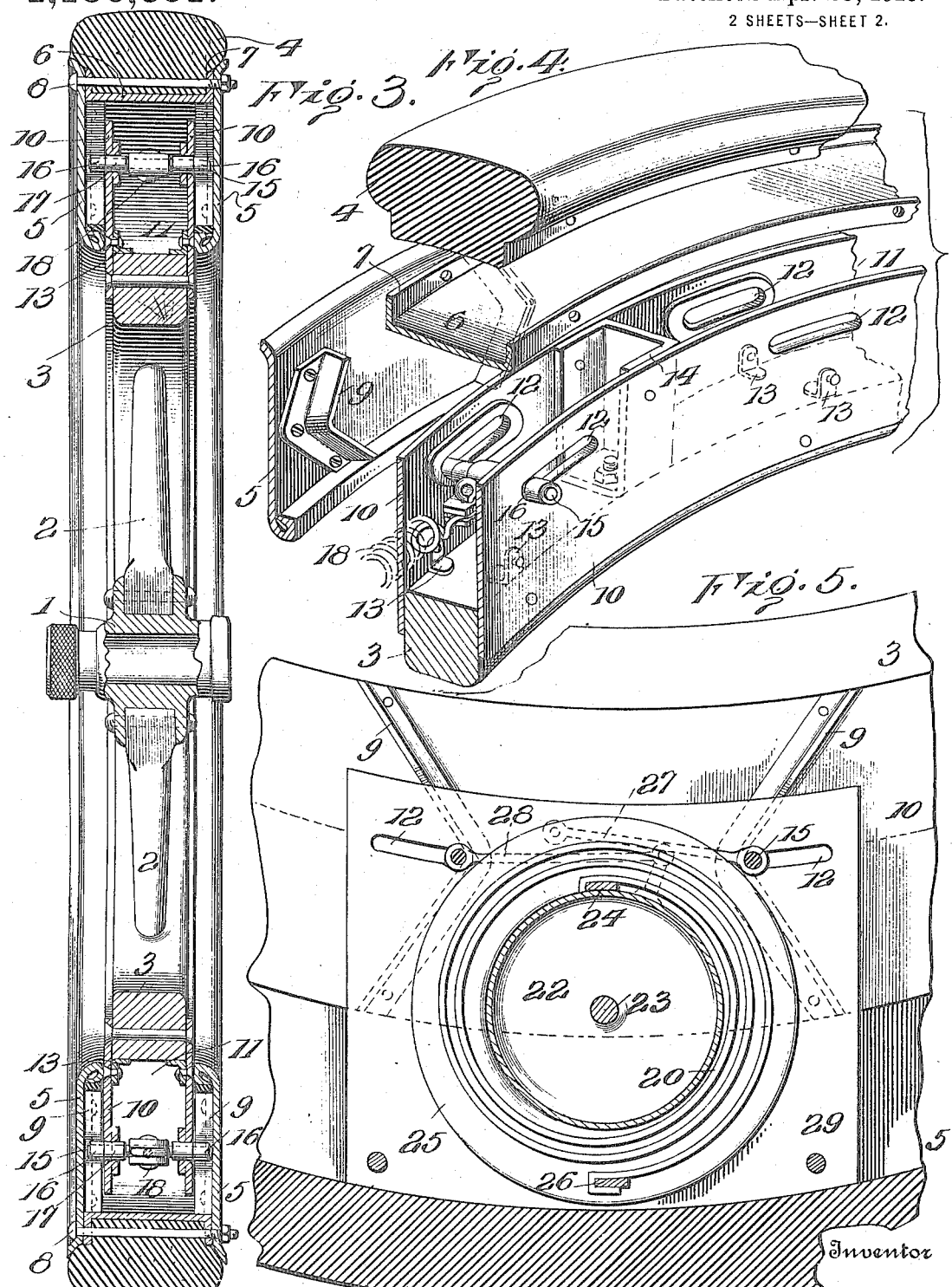

UNITED STATES PATENT OFFICE.

HARRY H. PENTECOST, OF NASHVILLE, TENNESSEE, ASSIGNOR OF ONE-HALF TO JAMES P. BREEN, OF NASHVILLE, TENNESSEE.

SPRING-WHEEL.

1,180,601.

Specification of Letters Patent.

Patented Apr. 25, 1916.

Application filed May 25, 1915. Serial No. 30,435.

*To all whom it may concern:*

Be it known that I, HARRY H. PENTECOST, a citizen of the United States, residing at Nashville, in the county of Davidson and State of Tennessee, have invented certain new and useful Improvements in Spring-Wheels, of which the following is a specification.

The invention aims to provide a wheel designed most especially for vehicles and which embodies a yieldable rim adapted to receive an eccentric movement and normally acted upon by spring means to yieldingly hold it in relative concentric or given position.

The invention provides a wheel which while possessing all, or nearly all, the advantages of the pneumatic tire is nevertheless free from the objections of vulnerability to which such tires are susceptible.

The invention further aims to provide a wheel of the type aforesaid in which the yieldable rim portion is capable of withstanding severe lateral stress and which is free to move for neutralizing shock and vibration with a minimum amount of resistance.

The invention also provides for the ready adaptation of the invention to vehicle wheels in use and upon the market without entailing any material change in such wheel other than necessary to place the rim and adjunctive parts in proper and operative position.

The invention, furthermore provides a wheel which, when used as a driver for propelling a motor vehicle, will have a limited circumferentially movable rim to compensate for any shock incident to starting or stopping, thereby avoiding discomfort to the occupant of the vehicle or strain to the running gear or mechanism of the vehicle.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings,—Figure 1 is a view in elevation of one-half of a vehicle wheel embodying the invention, a portion of the rim being in section; Fig. 2 is an enlarged detail section of the rim portion of the wheel; Fig. 3 is an enlarged vertical central transverse section of the wheel; Fig. 4 is a detail perspective view of a portion of the rim of the wheel, parts being separated; Fig. 5 is an enlarged detail view of a modification; Fig. 6 is a central longitudinal section of the rim portion of a further modified form of wheel.

Corresponding and like parts are referred to in the following description and indicated in all the views of the drawings by the same reference characters.

A wheel embodying the invention comprises essentially two portions, an inner or main portion and an outer or yieldable rim portion, the latter being mounted to receive an eccentric movement in the plane of the wheel but prevented from having any relative lateral play.

The inner or main portion of the wheel may be of ordinary construction resorted to in the construction of vehicle wheels, the same comprising a hub 1, spokes 2 and a felly 3. The outer portion is hollow and is preferably fitted with a tire 4 which may be of any construction. The outer portion of the wheel partakes of the nature of an attachment and may be adapted to any style or make of wheel in use or upon the market and comprises side plates 5 and an outer wall 6. The outer wall 6 consists of a band and is provided at its longitudinal or side edges with flanges 7 which are placed against the outer edge portions of the side plates 5 and secured thereto by suitable fastenings such as bolts 8 which extend across the wall 6 and through the inner portion of the tire 4. The side plates 5 may be of any construction best adapted in the practical embodiment of the invention. The inner walls of the side members or plates 5 of the yieldable rim or outer portion of the wheel are provided with cams 9 and these cams may constitute a part of the side walls or be separate therefrom and attached thereto in any manner. The cams 9 have a general radial arrangement and each embodies oppositely inclined portions, each portion operating according to the relative position of the cams in the rotation of the wheel. When the cams are formed as separate parts of the plates or side walls 5 they preferably consist of angle members, one of the wings serving as attaching means to receive the fastenings and the other wing providing the cam proper.

In order to adapt the invention to wheels as ordinarily constructed it is necessary to apply plates 10 to opposite sides of the felly 3, such plates being secured at their inner edge portions to opposite sides of the felly 3 and having their outer edge portions projecting so as to inclose a space 11 which is adapted to receive the spring or resilient or yieldable connecting means. When constructing wheels in accordance with the invention the outer annular space 11 may be formed in any manner. Slots 12 are formed in the side walls or plates 10 inclosing the space 11 and these slots have a circumferential or tangential arrangement. The slots 12 are provided in pairs and are regularly spaced. When the plates 10 are formed separately from the felly 3 and are attached thereto they are strengthened by means of braces 13 which may be of any nature and which as shown consist of angle brackets. Stays 14 are secured between the projecting portions of the plates 10 and serve to brace and strengthen the same.

A pin 15 is provided for each pair of slots 12 and is disposed transversely of the rim portion of the wheel and has its end portions passing through corresponding slots 12 and engaging the contiguous cams 9. In order to minimize the frictional engagement of the end portion of pins 15 with the walls of the slots 12 and cams 9, each of the pins 15 has its opposite end portions provided with bushings 16 and 17 which are loose thereon so as to rotate freely. The bushings 16 engage the cams 9 whereas the bushings 17 engage the walls of the slot 12.

Springs, resilient or yieldable connections, are provided to coöperate with each pair of pins 15 and such yieldable connections may be of a nature depending upon the adaptation of the invention. In one form the yieldable connections may consist of contractile helical springs 18 as indicated most clearly in Figs. 1 and 2. In another form the yieldable connection may consist of a block 19 of rubber as illustrated in Fig. 6. Fig. 5 shows still another form in which the yieldable connection consists of a spiral spring 20. In each of the several forms the yieldable connections are normally under tension and serve to yieldably hold the outer rim in a given position, the movement of such rim serving to augment the tension of the yieldable connections with the result that there is an increased tendency to return the rim to the predetermined position.

In the arrangement illustrated in Figs. 1 and 2 a movement of the yieldable rim serves to increase the distance between the pins 15 connected by means of the springs 18 with the result that the expanding of such springs increases their tension. The pins 15 occupying the upper and lower portions of the wheel ride upon the members of the radially disposed cams. The pins at opposite sides of the wheel are moved by a lifting action of the cams. It will thus be understood that the precise operation of the pins will depend upon their relative position but in every instance the pins move in the slots 12 and are actuated by the movement of the outer yieldable rim and the cams carried thereby.

In the modification shown in Fig. 6 the yieldable connection 19 is compressible and is arranged between two pins 15 which are brought together by the action of the cams. While the element 19 preferably consists of a block of rubber, it is to be understood that a yieldable member the substantial equivalent thereof may be employed. Plates 21 are fitted to the ends of the yieldable connection 19 for the pins 15 to ride upon, thereby preventing injury to or excessive wear of the element 19.

In the construction shown in Fig. 5 the spiral spring 20 is mounted upon a drum 22 which in turn is mounted upon an axis 23, the inner end of the spring 20 being attached to the drum 22 at 24. A plate 25 is disposed at each side of the spring 20 and drum 22 and a cross piece 26 connects the plate 25 upon one side with the plate upon the opposite side. The outer end of the spring 20 is attached to the cross piece 26. It will thus be understood that opposite ends of the spiral spring 20 are attached to the drum and plates 25, respectively. These parts, 22 and 25 are loose upon the axis 23 so as to turn freely thereon. A link 27 connects the plates 25 with one of the pins 15. A link 28 connects the drum with the companion pin 15. When the coöperating pins 15 ride upon the cams 9 they move the drum 22 and plates 25 in opposite directions thereby increasing the tension of the spring 20 by a two-fold action. A plate 29 is secured to each side wall of the rim portion of the wheel and is formed with slots 12 through which end portions of the pins 15 pass, the projecting ends of the pins engaging the cams 9 which are carried by the side walls 10 of the inner rim of the wheel. The walls 10 are disposed between the plates 29 and the plates 5.

It will be understood from the foregoing, taken in connection with the accompanying drawings, that a wheel embodying the invention comprises inner and outer portions which are constructed to inclose a space in which the yieldable connections and adjunctive parts are arranged so as to be housed and protected. The inner and outer rim portions of the wheel may be of any construction according to the application of the invention, whether adapted to wheels in use or already constructed, or whether embodied in specially constructed wheels in accordance with any particular design or manufacture.

The provision of the slots 12 enables the outer portion of the wheel to have a limited circumferential movement which is of advantage in neutralizing shock when starting or stopping, particularly when the invention is adapted to the drive wheels of motor vehicles. The radial movement of the outer portion of the wheel makes provision for compensating for shock and vibration, such as resulting from the wheel passing over an obstruction or dropping into a rut, or from the traveling over a rough surface. It will thus be understood that the outer rim portion of the wheel is adapted to yield circumferentially and radially, this combined movement admitting of the eccentric movement herein referred to.

It is further observed that a wheel may embody any number of yieldable, spring or resilient elements and that each of such elements is provided with a pair of pins or like parts 15 and cam elements 9 arranged to coact therewith.

The precise arrangement of the parts is unimportant within the purview of the invention so long as they have a relative disposition to coöperate in the manner herein specified.

Having thus described the invention, what is claimed as new is:

1. A wheel embodying inner and outer rim portions inclosing a space, the outer rim portion adapted to receive an eccentric movement, cams upon the inner faces of the side walls of the outer rim portion, the side walls of the inner rim portion being formed with circumferential slots, pins extending transversely of the rim portion, with their ends passing through the circumferential slots and engaging adjacent cams, and yieldable or spring elements disposed to coact with pairs of pins and adapted to have their tension increased by movement of the outer rim portion of the wheel from a given position.

2. In a wheel embodying an inner rim portion comprising spaced walls in which are formed corresponding circumferential slots, an outer rim portion embodying spaced side walls embracing the side walls of the inner rim portion, cams upon the inner faces of the side walls of the outer rim portion opposite the circumferential slots formed in the side walls of the inner rim portion, transversely disposed pins carried by the side walls of the inner rim portion, with their ends passing through the circumferential slots and engaging the adjacent cams, and yieldable elements inclosed by the inner and outer rim portions and coöperating with pairs of pins to have their tension increased.

3. In a wheel embodying inner and outer rim portions, the inner rim portion comprising a felly and side plates in which are formed circumferential slots, bracing means between the plates and between such plates and felly, oppositely disposed cams disposed upon the inner faces of the side walls of the outer rim portion, transversely disposed pins carried by the side walls of the inner rim portion and extending through the circumferential slots thereof and engaging the cams of the outer rim portion, and yieldable elements arranged between the side walls of the inner rim portion and connected to the pins supported thereby.

4. In a wheel, plates secured to opposite sides of the felly and projecting beyond the outer side thereof and formed with circumferential slots, pins supported in the slots and having their ends projecting beyond the said plates, yieldable means coöperating with the pins, and other plates at the sides of the first mentioned plates and provided with cams upon their inner faces to engage the projecting ends of the pins.

In testimony whereof I affix my signature.

HARRY H. PENTECOST.